US012739654B2

(12) United States Patent
Khanka et al.

(10) Patent No.: US 12,739,654 B2
(45) Date of Patent: Sep. 15, 2026

(54) PROVIDING INCREASED CAPACITY AT AN EVENT USING CELL ON WHEELS

(71) Applicant: T-MOBILE INNOVATIONS LLC, Overland Park, KS (US)

(72) Inventors: Bhagwan Singh Khanka, Las Vegas, NV (US); Victoriano Cabrera Abana, Las Vegas, NV (US); Paul Henrich Antonio Gabriel, Las Vegas, NV (US); Eugene Dwayne Livingston, North Las Vegas, NV (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 380 days.

(21) Appl. No.: 18/229,095

(22) Filed: Aug. 1, 2023

(65) Prior Publication Data

US 2025/0048119 A1 Feb. 6, 2025

(51) Int. Cl.

| | |
|---|---|
| ***H04W 16/00*** | (2009.01) |
| ***G06F 3/0482*** | (2013.01) |
| ***H04W 16/18*** | (2009.01) |
| ***H04W 24/02*** | (2009.01) |
| ***H04W 24/08*** | (2009.01) |
| ***H04W 72/12*** | (2023.01) |
| ***H04W 72/543*** | (2023.01) |

(52) U.S. Cl.

CPC .......... *H04W 16/18* (2013.01); *G06F 3/0482* (2013.01); *H04W 24/08* (2013.01); *H04W 72/543* (2023.01)

(58) Field of Classification Search

CPC ... H04W 16/18; H04W 24/08; H04W 72/543; G06F 3/0482

USPC .......................................................... 455/446

See application file for complete search history.

(56) References Cited

U.S. PATENT DOCUMENTS

| | | | | |
|---|---|---|---|---|
| 2010/0056163 A1* | 3/2010 | Schmidt | H04W 16/18 455/446 |
| 2012/0293653 A1* | 11/2012 | Schweikart | E21C 41/00 348/143 |
| 2018/0199209 A1* | 7/2018 | Brighenti | H04W 16/08 |
| 2021/0168235 A1* | 6/2021 | Nakamura | H04M 1/72469 |
| 2022/0292416 A1* | 9/2022 | Shetty | G06F 3/0482 |
| 2023/0021592 A1* | 1/2023 | Jia | H04W 72/20 |

OTHER PUBLICATIONS

IP.com search history (Year: 2025).*

* cited by examiner

*Primary Examiner* — Moustapha Diaby

(74) *Attorney, Agent, or Firm* — Shook, Hardy & Bacon L.L.P.

(57) ABSTRACT

Methods, systems, and a graphical user interface (GUI) are provided for determining an amount of additional network capacity at an event. The GUI provides data fields for inputting parameters of both the user devices expected at the event and the desired network throughput needed to provide users attending the event with a desired quality of service (QoS). The GUI provides a user criteria segment and a throughput criteria segment. Data entry fields describe metrics of the user devices expected to be at the event. The throughput criteria segment includes data entry fields for target data throughput variables that the network operator wants to achieve at the event. Once data entry is complete, a network operator selects a "CALCULATE" button on the GUI. The calculation outputs a number of sectors, a number of baseband frequencies, and a backhaul event for multiple types of wireless networks.

19 Claims, 5 Drawing Sheets

PROVIDING INCREASED CAPACITY AT AN EVENT USING CELL ON WHEELS

BACKGROUND

Mobile device users may attend a sporting game, concert, or other large gathering and may want to share messages, photos, or video with others while attending the event. In addition, there may be video content available at the event for users to download while attending. The event may be a sporting event such as a football game, basketball game, or auto race. In many of these events, a ticket holder may not be able to see all of the action because of where their seat is located or the action occurs on a part of the course not visible to all attendees. Users may want to see replays or live video, which may tax the network capacity at access points near the event. Some events may take place across a wide geographic area, such as at road races that may be in rural or other areas not well served by access points. Even if access points are present, the number of anticipated event attendees and the quality of service expected by users may exceed the network capacity. Temporary access points, which may be known as cell on wheels (COW) may be used to supplement the existing access points, however, planning the network services to ensure a desired quality of service (QoS) and capacity may be difficult.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods, systems, and a graphical user interface (GUI) are provided for determining an amount of additional network capacity at an event. The GUI provides data fields for inputting parameters of both the user devices expected at the event and the desired network throughput needed to provide users attending the event with a desired quality of service (QoS). The GUI allows a network operator to plan a number of COWs to deploy at an event and determine how adjusting or varying network parameters affects the number of COWs needed.

The GUI provides a user criteria segment that includes data entry fields that describe metrics of the user devices expected to be at the event. In addition, the GUI provides a throughput criteria segment that also includes data entry fields for target data throughput variables that the network operator wants to achieve at the event. The data entry fields of the GUI are monitored continuously to detect inputs. Once data entry is complete, a network operator selects a "CALCULATE" button on the GUI. The calculation outputs a number of sectors, a number of baseband frequencies, and a backhaul event for multiple types of wireless networks, such as 4G and 5G networks.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
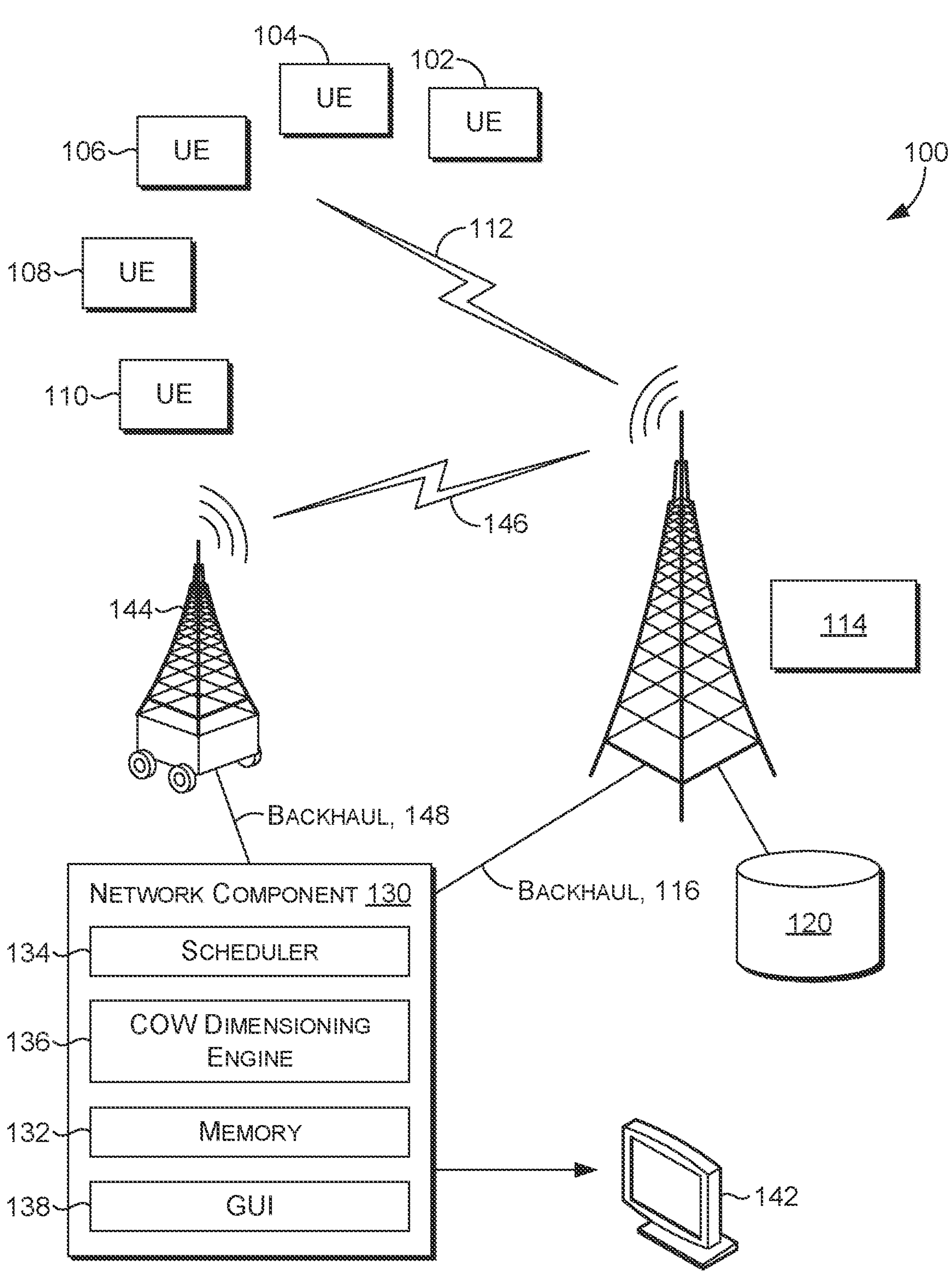
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Receive Power
RSRQ Reference Signal Receive Quality
RSSI Received Signal Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 32$^{nd}$ Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of access points (i.e., access point, node, cell sites, cell towers) to provide network coverage. The access points are employed to broadcast and transmit transmissions to user devices of the telecommunications network. An access point may be considered to be a portion of an access point that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, an access point may comprise one access point or more than one access point. Factors that can affect the telecommunications transmission include, e.g., location and size of the access points, and frequency of the transmission, among other factors. The access points are employed to broadcast and transmit transmissions to user devices of the telecommunications network. Traditionally, the access point establishes uplink (or downlink) transmission with a mobile handset over a single frequency that is exclusive to that particular uplink connection (e.g., an LTE connection with an EnodeB). The access point may include one or more sectors served by individual transmitting/receiving components associated with the access point (e.g., antenna arrays controlled by an EnodeB). These transmitting/receiving components together form a multi-sector broadcast arc for communication with mobile handsets linked to the access point.

As used herein, "access point" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE). The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby access point. A UE may be, in an embodiment, similar to device 500 described herein with respect to FIG. 5.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby access point or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR), reference signal received quality (RSRQ), and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

A first aspect of the present disclosure provides a computer-implemented method for determining an amount of additional network capacity at an event, displayed in a GUI. The GUI displays a user criteria segment that provides data entry fields that describe the metrics of user devices at the event. In addition, the GUI displays a throughput criteria segment. The throughput criteria segment comprises data entry fields for a target data throughput to be achieved based on at least one network characteristic. In operation, the data entry fields are constantly monitored to detect input. Once data entry is complete, a "CALCULATE" button is selected and the results are output to the GUI. The results may include: a number of sectors needed, a number of baseband frequencies, and a backhaul amount. The calculating may be performed for multiple types of networks.

A second aspect of the present disclosure provide a system for providing additional network capacity at an event in a network. The method begins with determining an estimated number of user devices expected to attend the event. Next, the method continues with determining throughput criteria for the estimated number of user devices. Then, based on the estimated number of user devices and the throughput criteria for the estimated number of user devices, a number of COWs needed to support the event are computed. The method concludes with displaying the number of COW sectors needed to support the event on a GUI.

Another aspect of the present disclosure is directed to a non-transitory computer storage media storing computer-usable instructions that cause the processors to determine an estimated number of user devices expected to attend the event. Then, the processors determine throughput criteria for the estimated number of user devices. Based on the estimated number of user devices and the throughput criteria for the estimated number of user devices, the processors then compute a number of COW sectors needed to support the event. The processors then display the number of COW sectors needed to support the event on a GUI interface.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user devices (UE) 102, 104, 106, 108, and 110, access point 114 (which may be a cell site, access point, or the like), and one or more communication channels 112. Network environment 100 may also include at least one COW 144 and a communication channel 146. The UEs 102, 104, 106, 108, and 110 may be attending an event such as a sporting event or concert where a large number of UEs may be operating. The event may include many more UEs than 102, 104, 106, 108, and 110 that are served by the network environment 100. Some UEs may be connected to the network but may not be active. Other UEs may be connected and active in viewing event programming. The communication channels 112 and 146 can communicate over frequency bands assigned to the carrier. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with the access point 114 or COW 144 in order to interact with a public or private network.

Figure 5:
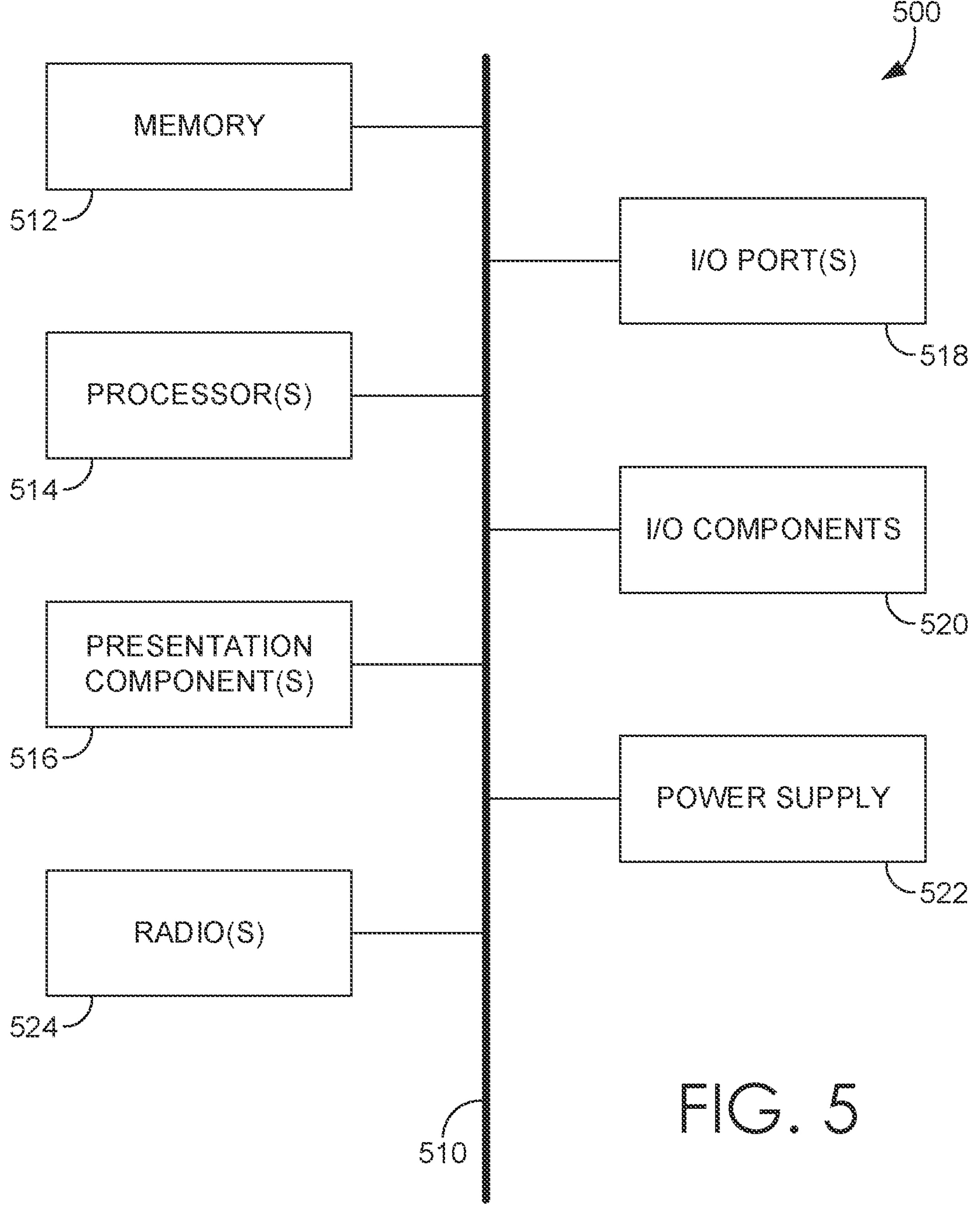
FIG. 5 depicts an exemplary computing device suitable for use in implementations of the present disclosure, in accordance with aspects herein.

In some aspects, each of the UEs 102, 104, 106, 108, and 110 may correspond to computing device 500 in FIG. 5. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE, CDMA, or any other type of network. In some cases, UEs 102, 104, 106, 108, and 110 in network environment 100 can optionally utilize one or more communication channels 112 or 146 to communicate with other computing devices (e.g., a mobile device(s), a server(s), a personal computer(s), etc.) through access point 114 or COW 144.

The network environment 100 may be comprised of a telecommunications network(s), or a portion thereof. A telecommunications network might include an array of devices or components (e.g., one or more access points), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure. Network environment 100 may comprise equipment placed in network operator facilities, but may also comprise equipment located at a customer's premises, known as customer premises equipment (CPE).

The one or more communication channels 112 and 146 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 and 146 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, access point 114 is configured to communicate with a UE, such as UEs 102, 104, 106, 108, and 110, that are located within the geographic area, or cell, covered by radio antennas of access point 114. Access point 114 may serve an area such as a stadium or concert venue where large numbers of UEs may be served. Access point 114 may include one or more access points, base transmitter stations, radios, antennas, antenna arrays, power amplifiers, transmitters/receivers, digital signal processors, control electronics, GPS equipment, and the like.

COW 144 is a portable access point that provides temporary network and wireless coverage. A COW 144 may be on wheels and may be moved to an event site to supplement the coverage of access point 114 at an event in the network. The COW 144 may be configured to communicate with a UE, such as UEs 102, 104, 106, 108, and 110, that are located within the geographic area or cell covered by radio antennas of COW 144. COW 144 may include one or more antennas, antenna arrays, power amplifiers, transmitters/receivers, digital signal processors, control electronics, GPS equipment, and the like.

As shown, access point 114 is in communication with a network component 130 and at least a network database 120 via a backhaul channel 116. COW 144 is in communication with the network component 130 and the network database 120 via a backhaul channel 148. As the UEs 102, 104, 106, 108, and 110 collect individual signal information, the signal information can be automatically communicated by each of the UEs 102, 104, 106, 108, and 110 to the access point 114. UEs communicating through COW 144 may automatically communicate signal information to the COW 144, which may store the signal information. Access point 114 may store the signal information and data communicated by the UEs 102, 104, 106, 108, and 110 at a network database 120. Alternatively, the access point 114 and COW 144 may automatically retrieve the status data from the UEs 102, 104, 106, 108, and 110, and similarly store the data in the network database 120. The signal information and data may be communicated or retrieved and stored periodically within a predetermined time interval which may be in seconds, minutes, hours, days, months, years, and the like.

The signal information may also be collected during a period designated as an event period with a duration of the length of a designated event. The event may last for a predetermined period of time with the duration coinciding with the length of a sporting event or concert. The event may occur over multiple days with a different predetermined duration for each day and with a different event period for each day. With the incoming of new data, the network database 120 may be refreshed with the new data every time, or within a predetermined time threshold so as to keep the status data stored in the network database 120 current. For example, the data may be received at or retrieved by the access point 114 or COW 144 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, a scheduler 134, a COW dimensioning engine 136, and a graphical user interface (GUI) 138. All determinations, calculations, and data further generated by the scheduler 134, COW dimensioning engine 136, and GUI 138 may be stored at the memory 132 and also at the data store 140. Although the network component 130 is shown as a single component comprising the memory 132, scheduler 134, COW dimensioning engine 136, GUI 138, and the data store 140, it is also contemplated that each of the memory 132, the scheduler 134, the COW dimensioning engine 136, and the GUI 138, may reside at different locations, be its own separate entity, and the like, within the home network carrier system.

The network component 130 is configured to retrieve signal quality metrics and carrier loading metrics from the access point 114, COW 144, or one of the UEs, 102, 104, 106, 108, and 110. Signal quality metrics can include any one or more of multiple metrics, such as signal-to-interference and noise (SINR), reference signal received power (RSRP), and reference signal received quality (RSRQ). The network component 130 can also track uplink and downlink user traffic. The scheduler 134 can observe data usage on at least one common channel over the network using measurement metrics such as SINR, RSRP, and RSRQ. The scheduler 134, the COW dimensioning engine 136, and the GUI 138 may each be located in a central office or other centralized location, but may also be mounted on an access point at or near the event location. For a distributed radio access network, the scheduler 134 can be located at the access point 114. The scheduler 134, acting in conjunction with the COW dimensioning engine 136 and the GUI 138 may then ensure that the UEs 102, 104, 106, 108, and 110, receive event network services. The COW dimensioning engine 136 and GUI 138 may be used in the planning for the event to assess coverage needs and finalize a number of COWs needed by the event. The COW dimensioning engine 136 and GUI 138 may also be used during the event to refine coverage and bring additional COWs into the network as usage needs change.

Figure 2:
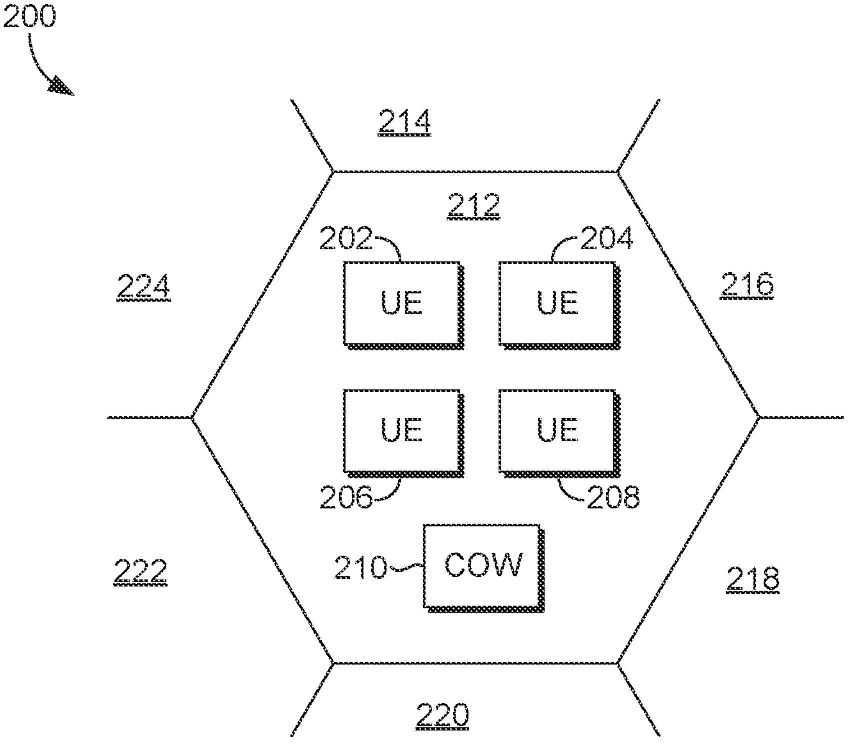
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cell sites 212, 214, 216, 218, 220, 222, 224, each including access point 114, backhaul channel 116, antenna for sending and receiving signals over communication channels 112, network database 120 and network component 130. The geographic area 200 may also include COWs, such as COW 210 in cell site 216, to cover a special event with expanded network coverage. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, and 208, may be located within geographic area 200 collecting UE data that is useable by network component 130, in accordance with aspects herein. UEs 202, 204, 206, and can move within the cell currently occupying, such as cell site 212 and can move to other cells such as adjoining cell sites 214, 216, 218, 220, 222 and 224. COW 210 may be moved within cell site 212, but may also move to another cell site, such as one of cell sites 214, 216, 218, 220, 222, and 224, to cover a special event that may have activities crossing the boundaries of multiple cell sites. Additional COWs may also be positioned in cell sites 212, 214, 216, 218, 220, 222, and 224 as part of the special event.

Figure 3:
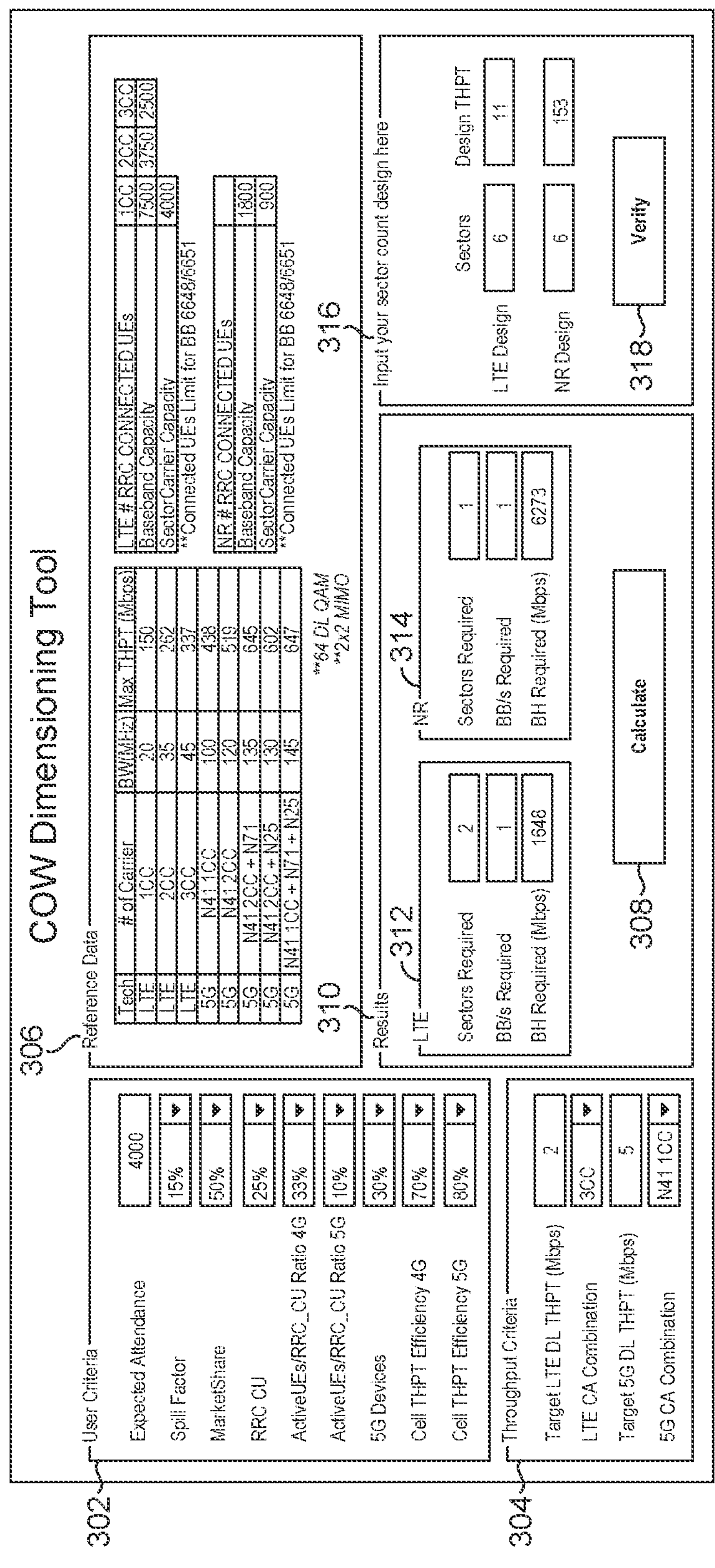
FIG. 3 depicts a graphical user interface for use in an exemplary method for determining an amount of additional network capacity at an event using COWs at an event in a network, in accordance with aspects herein.

FIG. 3 depicts a graphical user interface (GUI) that forms a part of a system for use in an exemplary method for determining increased capacity at an event using COWs at an event in a network, in accordance with aspects herein. The COW dimensioning tool 300 includes a GUI shown in FIG. 3. The COW dimensioning tool 300 allows a network operator to determine how many COWs may be needed for an event or other special coverage scenario to deliver a predetermined QoS to subscribers at the event. The User Criteria segment 302 in the GUI requests the following information: expected attendance, spill factor, market share, radio resource control channel utilization (RRC CU), Active UEs/RRC CU Ratio 4g, Active UEs/RRC CU Ratio 5G, 5G devices, cell throughput (THPT) efficiency 4G, and cell THPT 5G. The expected attendance may be determined by a network operator and may be based on advance event ticket sales, attendance at previous events, or an estimate. The spill factor may represent additional coverage available for use if additional unexpected attendees are at the event.

Market share may represent a market share of the network operator planning for the event. The market share may reflect a network operator's share of the market in the geographic area of the event, or may represent a nationwide market share of the event. A network operator may elect to sell passes for special event content to attendees who may not be subscribers of the network sponsoring the event.

RRC CU reflects UEs attempting to access the network at the event. The RRC is the signaling protocol exchanged between the UE and an access point in a 4G or 5G network. The RRC CU provides connection establishment, broadcast of system information, radio bearer reconfiguration, and release. RRC CU may reflect a number of users expected to access the network at the event. The User Criteria segment 302 may also include a ratio of active UEs/RRC CU 4G, which takes into account 4G devices. A similar ratio for 5G devices is the active UEs/RRC CU may also be used. The percentage of 5G devices of the total devices at the event may also be added to the User Criteria segment 302. The User Criteria also includes throughput efficiency criteria for both 4G and 5G, which may appear as Cell THPT 4G and Cell THPT 5G. This may be a desired efficiency that the network operator wants to achieve at the event. The User Criteria segment 302 allows direct number entry for some fields while other fields permit selections from a drop-down menu.

The GUI also includes a Throughput Criteria segment 304 with fields that include target LTE downlink (DL) THPT in Mbps and target 5G DL THPT in Mbps. The Throughput Criteria may also include carrier aggregation (CA) selections for LTE CA combination, with the selection made from a drop-down menu of 1Component Carrier (CC), 2CC, and 3CC. An LTE UE may be allocated uplink and downlink resources on an aggregated resource that consists of two or more CCs. The CCs may be of different bandwidths.

The Reference Data block 306 of the COW dimensioning tool 300 provides reference information on channels available in the network. The channels include both LTE and 5G channels. The channel information includes bandwidth and maximum throughput data for each channel. The channels include allocations for the N25 band, which is a 1900 MHz band that uses frequency division duplexing (FDD), N41 band, which is a 2500 MHz band that uses time division duplexing (TDD), and the N71 band, which is a 600 MHz band that uses FDD.

FDD is a method for establishing a full duplex communications link. FDD uses two different radio frequencies, one for transmitter operation and the other for receiver operation. In operation, the transmitter and receiver as assigned to different communication channels. TDD is another method for establishing a full-duplex communication link. Uplink communications are separated from downlink communications by the allocation of different time slots in the same frequency band. TDD allows asymmetric flow for uplink and downlink data transmission.

The Reference Data block 306 may also include channels using carrier aggregation, such as 1CC, 2CC, 3CC for LTE channels, and N41 1CC, N41 2CC, N41 2CC+N71. Carrier aggregation may be used in LTE and 5G networks to enhance bandwidth, and thus increase the bitrate. Carrier aggregation may be used with both FDD and TDD. Carrier aggregation is a software functionality in RANs which allows network operators to combine the capabilities of cell at distinct frequency allocations for improved network performance. Each aggregated carrier may be known as a component carrier (CC) and may have a bandwidth of 1.4, 3, 5, 10, 15, or 20 MHz and may have a maximum of five CCs may be aggregated, for a maximum aggregated bandwidth of 100 MHz After a user of the COW dimensioning tool 300 enters the requested information in the user criteria segment 302 and the throughput criteria segment 304, the user proceeds to select that Calculate block 308. The Calculate block 308 directs the processors to perform the network analysis computations to size the network needed to support the event. The results of those computation may be output in the results block 310, which has a sub-block for LTE results 312 and a sub-block for 5G results 314. The LTE results 312 output inform the network operator of the number of sectors needed, which may be based on a number of UEs expected to use the event's services. The LTE results 312 also include a number of baseband (BB) frequencies needed for data transmission as well as an amount of backhaul (BH) capacity, in Mbps, that are needed. The LTE results 312 displays the results needed for 5G capacity at the event. The number of sectors needed may be a factor of the number of UEs at the event. If a network operator has a limit of how many UEs it will accommodate at the event, that number may be used to determine a number of sectors. Conversely, if a network operator is willing or able to provide only a certain number of sectors, such as by having limited COWs available, then the number of sectors determines how many UEs may be served at the event. BH capacity requirements are also output in the results sections of the COW dimensioning tool 300.

Event planning is needed to provide the QoS needed at the event to ensure user satisfaction and also to determine what coverage is needed, including RF capacity, BH capacity for 4G, 5G, LTE, and NR, and BB capacity. BB processing is used to synthesize the baseband signal to be transmitted or to decode the received baseband signal. The BB is a range of frequencies occupied by a signal that has not been modulated to higher frequencies. The BH is the intermediate link between the core network, that is, the connection between the access point towards the core network. The core network is the central conduit designed to transfer network traffic at high speeds. In this application, the core network delivers high speed data to users attending an event. The high speed data may include special event content.

After the results have been calculated, a COW dimensioning tool 300 user may also verify the sector count using the Sector Count Input block 316. The user may input a number of LTE sectors and a number of NR sectors. Then the Verify button 318 may be selected. The user may compare the design throughput output with QoS metrics and determine if the calculated number of sectors meet the design needs of the event.

Figure 4:
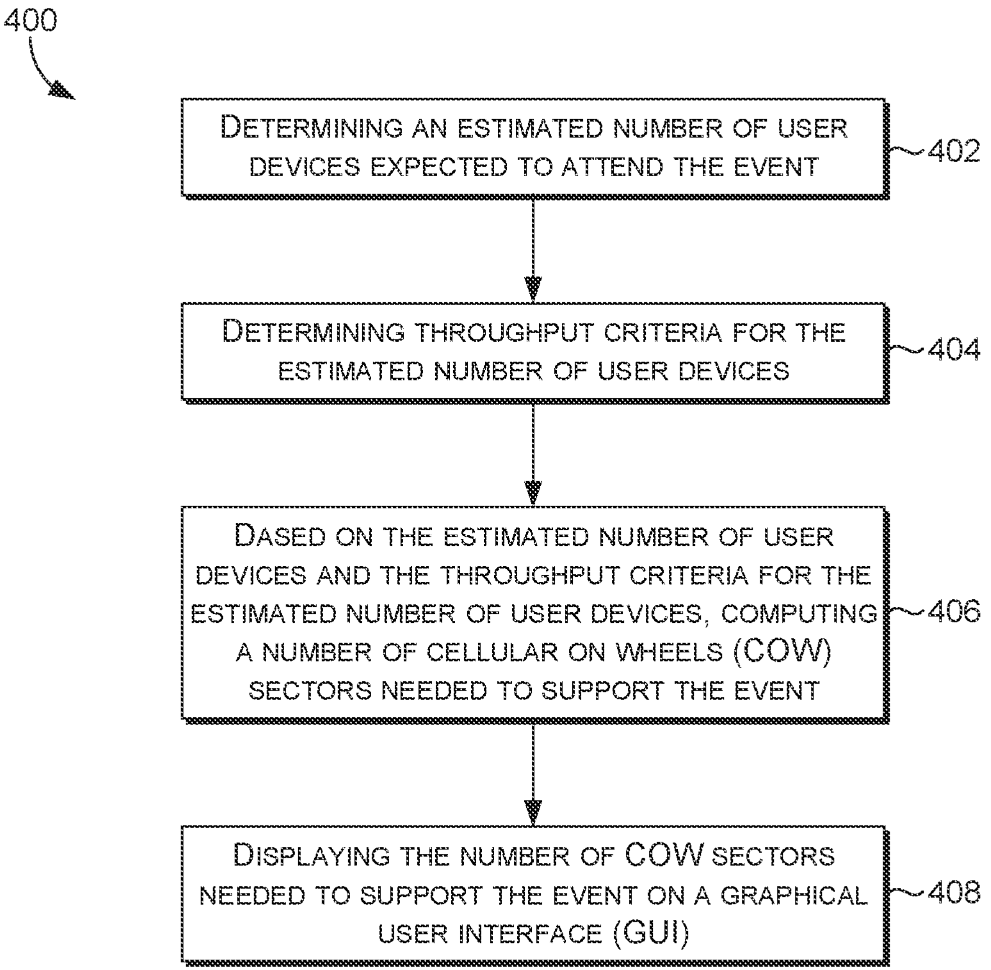
FIG. 4 depicts a flow diagram of an exemplary method for providing increased network capacity at an event in a network.

FIG. 4 depicts a flow diagram of an exemplary method for determining an amount of additional network capacity at an event, in accordance with aspects herein. The method 400 begins in block 402 with determining an estimated number of user devices expected to attend the event. Next, in block 404 the method continues with determining throughput criteria for the estimated number of user devices. Then, based on the estimated number of user devices and the throughput criteria for the estimated number of user devices, the method continues in block 406 with computing a number of COW sectors needed to support the event. The method concludes in block 408 with displaying the number of COW sectors needed to support the event on a GUI.

The estimated number of user devices expected to attend the event may comprise LTE user devices as well as NR devices. The throughput criteria also includes LTE and NR variables. The variables may include target LTE downlink throughput and carrier aggregation combinations as wells as 5G target downlink throughput and carrier aggregation combinations. The GUI may display a number of LTE COWs needed as well as a number of NR COWs needed. The GUI may also display baseband frequencies and backhaul quantity for both 4G and 5G networks.

FIG. 5 depicts an exemplary computing device suitable for use in implementations of the present disclosure, in accordance with aspects herein. With continued reference to FIG. 5, computing device 500 includes bus 510 that directly or indirectly couples the following devices: memory 512, one or more processors 514, one or more presentation components 516, input/output (I/O) ports 518, I/O components 520, radio(s) 524, and power supply 522. Bus 510 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. Memory 512 may be removable, nonremovable, or a combination thereof. Exemplary memory includes solid-state memory, hard drives, optical-disc drives, etc. Computing device 500 includes one or more processors 406 that read data from various entities such as bus 510, memory 512 or I/O components 520. One or more presentation components 516 present data indications to a person or other device. Exemplary one or more presentation components 516 include a display device, speaker, printing component, vibrating component, etc. I/O ports 518 allow computing device 500 to be logically coupled to other devices including I/O components 520, some of which may be built into computing device 500. Illustrative I/O components 520 include a microphone, joystick, game pad, satellite dish, scanner, printer, wireless device, etc.

The radio(s) 524 represents one or more radios that facilitate communication with a wireless telecommunications network. While a single radio 524 is shown in FIG. 5, it is contemplated that there may be more than one radio 524 coupled to the bus 510. Illustrative wireless telecommunications technologies include CDMA, GPRS, TDMA, GSM, and the like. The radio 524 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a access point, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for determining an amount of additional network capacity at an event, displayed in a graphical user interface (GUI), the method comprising:
- displaying a user criteria segment of the GUI, wherein the user criteria segment provides data entry fields that describe metrics of user devices at the event;
- displaying a throughput criteria segment of the GUI, wherein the throughput criteria segment comprises data entry fields for a target data throughput to be achieved based on at least one network characteristic;
- continuously monitoring the data entry fields of the user criteria segment and the throughput criteria segment to detect input in the data entry fields; and
- based on detecting input in at least a portion of the data entry fields, calculating one or more of a number of sectors, a number of baseband frequencies, or a backhaul amount, wherein the calculating is performed for one or more types of wireless networks,
- wherein the GUI further comprises a reference data segment that displays, for each of the one or more types of wireless networks, frequency bands and carrier aggregation information, and wherein the calculating is performed based on the frequency bands and carrier aggregation information displayed in the reference data segment.

2. The computer-implemented method of claim 1, wherein the GUI further comprises a sector count design segment.

3. The computer-implemented method of claim 2, wherein the sector count design segment of the GUI comprises data entry fields for long-term evolution (LTE), LTE design throughput, new radio (NR) sector count, and NR design throughput.

4. The computer-implemented method of claim 1, wherein the user criteria segment of the GUI comprises data entry fields for at least one of: expected attendance, spill factor, market share, radio resource control channel utilization, a ratio of active 4G user devices to radio resource control channel utilization, a ratio of 5G active user devices to radio resource control channel utilization, a percentage of 5G user devices, cellular throughput efficiency for 4G, and cellular throughput efficiency for 5G.

5. The computer-implemented method of claim 1, wherein the throughput criteria segment of the GUI comprises data entry fields for: target long-term evolution (LTE) downlink throughput, LTE carrier aggregation combination, target 5G downlink throughput, and 5G carrier aggregation combination.

6. The computer-implemented method of claim 1, wherein the data entry fields for the user criteria segment and the throughput criteria segment comprise drop-down menu selections.

7. The computer-implemented method of claim 1, further comprising a reference data segment of the GUI.

8. The computer-implemented method of claim 7, wherein the reference data segment of the GUI displays data fields comprising at least one of: frequency bands in each network technology, a number of long-term evolution (LTE) radio resource connected user devices, or a number of new radio (NR) radio resource connected user devices.

9. The computer-implemented method of claim 8, wherein the frequency bands in each network technology further comprises a number of channels and carrier aggregation information.

10. A method for determining an amount of additional network capacity at an event, the method comprising:
- determining an estimated number of user devices expected to attend the event;
- determining throughput criteria for the estimated number of user devices;
- based on the estimated number of user devices and the throughput criteria for the estimated number of user devices, computing a number of cellular on wheels (COW) sectors needed to support the event; and
- displaying the number of COW sectors needed to support the event on a graphical user interface (GUI),
- wherein displaying the number of COW sectors on the GUI displays a number of long-term evolution (LTE) COWs and a number of new radio (NR) COWS.

11. The method of claim 10, wherein the estimated number of user devices expected to attend the event comprises long-term evolution (LTE) user devices and new radio (NR) device.

12. The method of claim 10, wherein the throughput criteria include long-term evolution (LTE) and new radio (NR) technologies.

13. The method of claim 12, wherein the throughput criteria include a target LTE downlink throughput and a LTE carrier aggregation combination.

14. The method of claim 12, wherein the throughput criteria include a target 5G downlink throughput and a 5G carrier aggregation combination.

15. The method of claim 10, wherein displaying the number of LTE COWs and the number of NR COWs also displays a number of LTE baseband frequencies, a quantity of LTE backhaul, a number of NR baseband frequencies, and a quantity of NR backhaul.

16. A non-transitory computer storage media storing computer-usable instructions that, when used by one or more processors, cause the processor to:

determine an estimated number of user devices expected to attend the event;

determine throughput criteria for the estimated number of user devices;

based on the estimated number of user devices and the throughput criteria for the estimated number of user devices, compute a number of cellular on wheels (COW) sectors needed to support the event; and display the number of COW sectors needed to support the event on a graphical user interface (GUI), wherein displaying the number of COW sectors on the GUI displays a number of long-term evolution (LTE) COWs and a number of new radio (NR) COWS.

17. The non-transitory computer storage media of claim 16, wherein the estimated number of user devices expected to attend the event comprises long-term evolution (LTE) user devices and new radio (NR) device.

18. The non-transitory computer storage media of claim 16, wherein the throughput criteria include long-term evolution (LTE) and new radio (NR) technologies.

19. The non-transitory computer storage media of claim 16, wherein the throughput criteria include a target LTE downlink throughput, a LTE carrier aggregation combination, a target NR downlink throughput, and a NR carrier aggregation throughput.

* * * * *